(12) United States Patent
Urabe et al.

(10) Patent No.: US 8,923,451 B2
(45) Date of Patent: Dec. 30, 2014

(54) SIGNAL DETECTION DEVICE AND SIGNAL DETECTION METHOD

(75) Inventors: Yoshio Urabe, Kanagawa (JP); Kazuhiro Ando, Kanagawa (JP); Masataka Irie, Kanagawa (JP); Hiroshi Takahashi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 75 days.

(21) Appl. No.: 13/817,668

(22) PCT Filed: Mar. 7, 2012

(86) PCT No.: PCT/JP2012/001570
§ 371 (c)(1),
(2), (4) Date: Feb. 19, 2013

(87) PCT Pub. No.: WO2012/132252
PCT Pub. Date: Oct. 4, 2012

(65) Prior Publication Data
US 2013/0148766 A1    Jun. 13, 2013

(30) Foreign Application Priority Data
Mar. 31, 2011   (JP) ................ 2011-077441

(51) Int. Cl.
*H04L 27/06* (2006.01)
*H04L 27/26* (2006.01)
*H04B 17/00* (2006.01)
*H04B 7/08* (2006.01)

(52) U.S. Cl.
CPC ........ *H04L 27/2649* (2013.01); *H04B 17/0045* (2013.01); *H04B 7/0828* (2013.01)
USPC ............................ 375/343; 375/142; 375/150

(58) Field of Classification Search
USPC .......................................... 375/142, 150, 343
See application file for complete search history.

(56) References Cited

U.S. PATENT DOCUMENTS

2007/0147552 A1* 6/2007 Olesen et al. ................. 375/343
2011/0085612 A1* 4/2011 Muraoka et al. ............. 375/260

FOREIGN PATENT DOCUMENTS

| CN | 102047749 A | 5/2011 |
|---|---|---|
| JP | 2004-221940 A | 8/2004 |
| JP | 2011-101234 A | 5/2011 |
| WO | 2009/145326 A1 | 12/2009 |

OTHER PUBLICATIONS

International Search Report for PCT/JP2012/001570 dated May 22, 2012.

* cited by examiner

*Primary Examiner* — Curtis Odom
(74) *Attorney, Agent, or Firm* — Pearne & Gordon LLP

(57) ABSTRACT

In this signal detection device (100), a delaying unit (101) delays a first distributed signal or a second distributed signal distributed from a received signal for a period of time of T1 to form a first multiplication signal, and delays the one for a period of time of T2 (T2>T1) to form a second multiplication signal. An integrator (104) calculates a first correlation value by integrating the result of multiplying the first distributed signal and the first multiplication signal. An integrator (105) calculates a second correlation value by integrating the result of multiplying the second distributed signal and the second multiplication signal. An evaluation unit (108) evaluates whether the signal to be detected, which is a periodic signal with a period of T1 or a periodic signal with a period of T2, exists or not, on the basis of the first correlation value and the second correlation value.

10 Claims, 13 Drawing Sheets

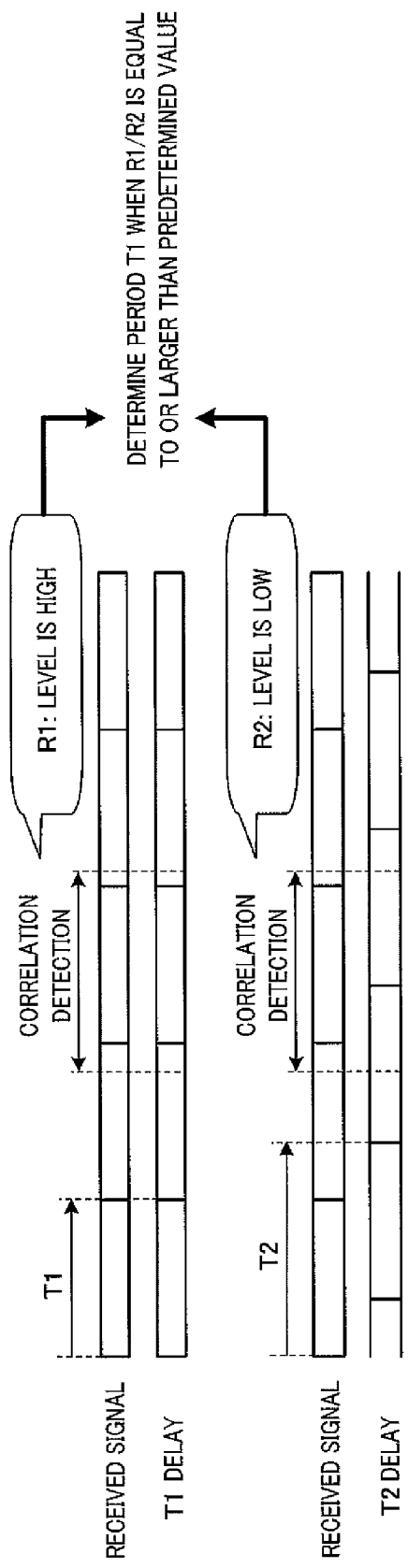
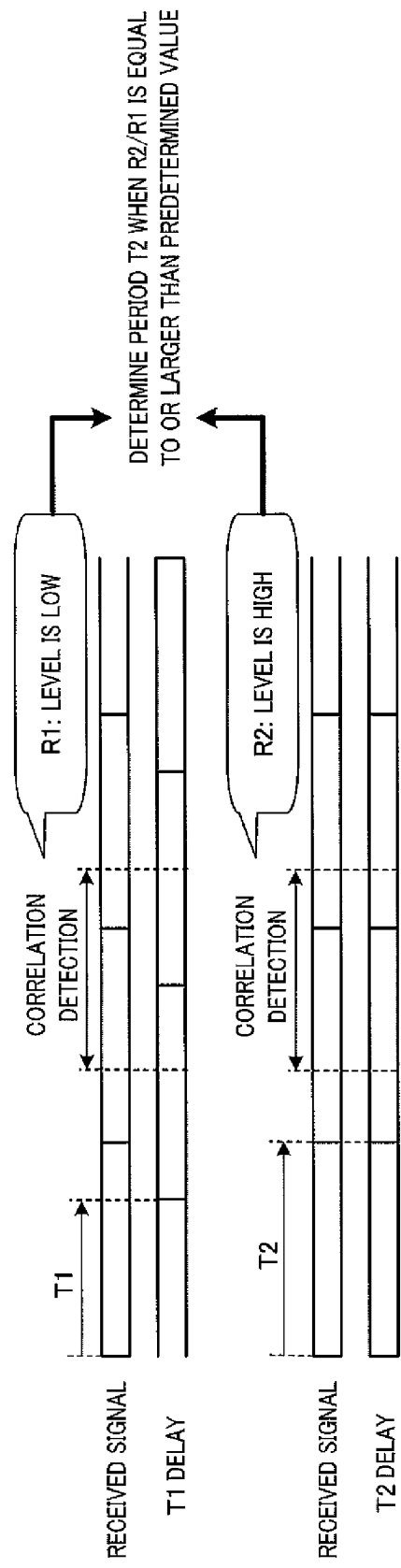
FIG. 5A
FIG. 5B

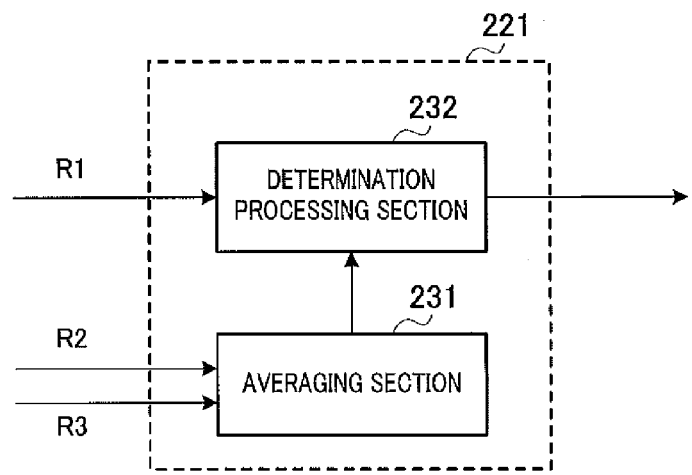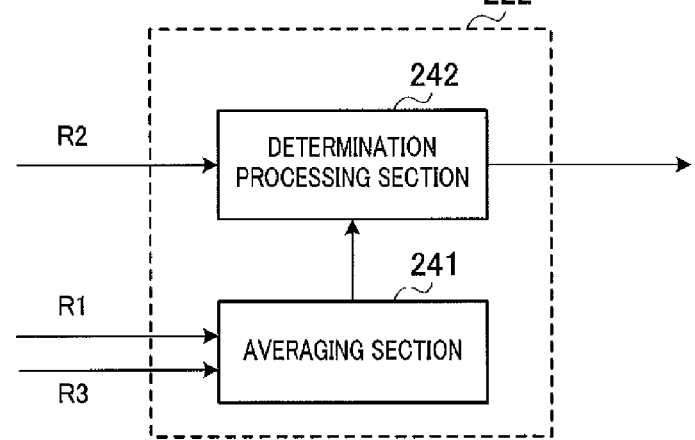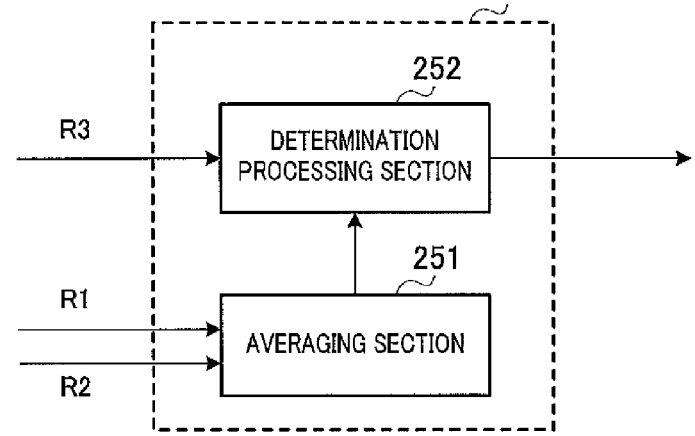
FIG. 8

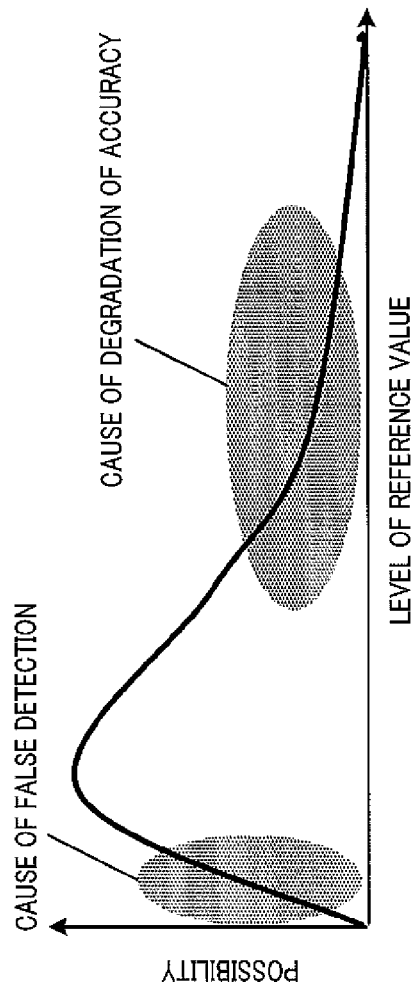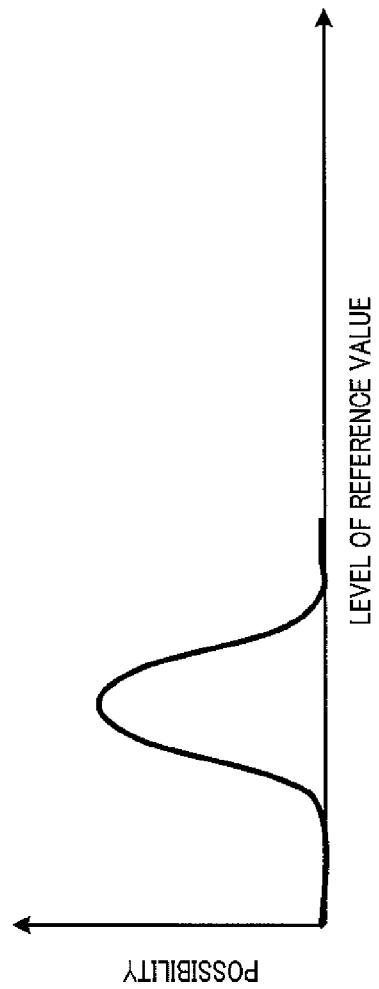

SIGNAL DETECTION DEVICE AND SIGNAL DETECTION METHOD

TECHNICAL FIELD

The present invention relates to a signal detection apparatus and a signal detection method.

BACKGROUND ART

Multiple wireless communication standards have been formulated or considered in recent millimeter wave wireless communication using a 60 GHz band. Major wireless LAN/wireless PAN standards that do not require licenses, for example, include WiGig, IEEE 802.15.3C, Wireless HD and ECMA-387. Formulation of IEEE 802.11ad standard is also in progress.

Multiple wireless schemes (for example, a single-carrier scheme and an OFDM (Orthogonal Frequency Division Multiplexing) scheme) also coexist for intended applications in each standard.

Multiple systems corresponding to the respective multiple wireless communication standards coexist, and the multiple wireless schemes also coexist in each system. Once the millimeter wave wireless communication is popularized, it is possible that multiple different wireless schemes may often be used in proximity to one another. The multiple systems can simultaneously communicate in the same space by each using a different frequency channel.

The frequency channels available in the 60 GHz band, however, are limited to three or four channels. Once the millimeter wave wireless communication is popularized, it is expected in not a small number of cases that multiple different systems use the same frequency channel. A concern is that interference may occur among the systems and communication performance may be degraded in each system.

In order to avoid the interference, firstly, interference signals from heterogeneous systems to a target system need to be detected. Carrier sense with power (hereinafter simply represented as "carrier sense") has been widely used as a conventional signal detection method. The carrier sense is a method of detecting signals by detecting power.

Specifically, in the carrier sense, power of a received signal is measured, and if a value of the measured power exceeds a predetermined threshold, it is recognized that the signal is detected. The carrier sense is characterized by wide applicability regardless of the class of the signal. In contrast, the carrier sense has disadvantages as follows.

In other words, noise is indistinguishable from the signal, depending on the power. If the predetermined threshold is set to be low to enhance detection sensitivity, false detection, in which the noise is incorrectly detected as the signal, is likely to occur. In contrast, if the predetermined threshold is set to be high to prevent the false detection, the detection sensitivity is degraded.

With the carrier sense having the above disadvantages, it may possibly be difficult to satisfy the level of interference detection sensitivity required for receiving signals modulated with multilevel modulation that has been increasingly used in recent years.

In other words, in recent wireless communication, the multilevel modulation is often used due to increase in transmission rates. In the communication using the multilevel modulation, data errors are likely to occur even with a low level of interference. Accurate detection of such a low level of interference is also required for effective avoidance of the interference.

There is a technique using a correlation among signals, as a signal detection method having signal detection sensitivity higher than that of the carrier sense. This technique is broadly divided into a cross-correlation method and an auto-correlation method. The cross-correlation method detects a signal to be detected, based on a correlation value between a preamble part included in a received signal, and a candidate for a known pattern signal used in the preamble part. The auto-correlation method detects the signal to be detected, based on a correlation value between preamble parts of a first signal and a second signal, which are provided by replication of the received signal.

A periodic signal including repetition of a specific signal pattern is often used in the preamble part. In the auto-correlation method, periodicity of the periodic signal is used for the signal detection. The signal detection sensitivity of the auto-correlation method is generally lower than that of cross-correlation detection, while it is higher than that of the carrier sense. This is because, with the signal detection sensitivity of the auto-correlation method, the noise is distinguishable from the signal based on the periodicity of the periodic signal.

Unlike the cross-correlation method, a receiver does not need to know the above specific signal pattern in the auto-correlation method. Accordingly, a receiving apparatus can be implemented in a simple configuration. Moreover, the auto-correlation method needs to detect just waveform periodicity, and therefore does not require processing of the received signal according to the symbol rate of the interference signal. The auto-correlation method has an advantage of easy applicability to the signal detection also for the heterogeneous systems having different symbol rates or modulation schemes.

The signal pattern of the periodic signal used in the preamble part has been defined in each of the multiple wireless communication standards associated with the above described millimeter wave wireless communication. A period of the signal pattern to be used, however, is common to some wireless communication standards. The number of variations of the period of the periodic signal used in the preamble part is relatively smaller than that of the signal pattern. Accordingly, an auto-correlation detector for major periods is provided in the receiving apparatus, which thus can widely detect interference signals from a wide variety of the heterogeneous systems.

FIG. 1 is a diagram provided for describing the auto-correlation method. FIG. 1A illustrates the basic configuration of the auto-correlation detector. FIG. 1B is a diagram illustrating an image of an auto-correlation process.

In the auto-correlation detector illustrated in FIG. 1A, a second signal, in a first signal and the second signal that have been provided by distribution of the received signal, is delayed for a predetermined time by a delay device (delay). The predetermined time corresponds to the period of the periodic signal used in the preamble part of the signal to be detected. The first signal is multiplied by the delayed second signal in a multiplier. The auto-correlation detector of FIG. 1A is provided with a simple multiplier, which, however, may be a complex multiplier. This is because complex baseband signals are generally handled, and multiplication of complex conjugates is executed.

A result of the multiplication obtained in the multiplier is integrated in an integrator for a predetermined period. A correlation value is thereby obtained.

An absolute value of the obtained correlation value is calculated by an absolute value calculation section. In a comparator, the calculated absolute value of the correlation value is compared with a predetermined threshold, and a signal that depends on a result of the comparison is outputted.

Here, the correlation value obtained from the complex baseband signal is a complex number. In an ideal state where the period of the periodic signal used in the preamble part included in the received signal is identical to the delay time given to the second signal in the delay device, however, the resultant correlation value is a positive real number.

In contrast, for example, if phase rotation occurs due to a cause of error of clock deviation, the resultant correlation value may not necessarily be the positive real number. Instead of direct use of the correlation value obtained in the integrator, the absolute value of the correlation value is herein used for the determination. If the cause of error is assured to be sufficiently small, however, a correlation component is substantially identical to a real component, while an imaginary component, for example, is caused by noise. Instead of the use of the absolute value of the correlation value, the real component of the correlation value may be used for the determination.

In other words, the absolute value of the correlation value or the real component of the correlation value is inputted to the comparator, and compared with the predetermined threshold. If the input value is larger than the predetermined threshold, it is determined that the comparator has detected the signal.

In the auto-correlation detector, appropriate setting of the threshold is required to ensure highly-sensitive detection of weak signals with as little false detection as possible. The false detection means incorrect detection of the noise as the signal to be detected, even though the signal to be detected is not received.

With a fixed threshold, the false detection occurs if background noise has fluctuated. The level of the background noise significantly varies and fluctuates, for example, due to variations, temperature characteristics and fluctuations over time in a high-frequency analog circuit, or noise caused by an internal clock circuit. In a receiver using automatic gain control (AGC), the level of the baseband signal and the level of a noise component in the baseband signal significantly fluctuate depending on the level of an input signal.

In particular, in a system in which a packetized signal is transmitted as a transmission frame, fluctuations in the level of the received signal in time, due to the AGC, are extreme in the beginning part of the transmission frame. Accordingly, in order to prevent the false detection in the case of the fixed threshold, the threshold needs to be set to a sufficiently large value. In such setting, the weak signals are not detected as described above, which leads to degradation of the detection sensitivity of the auto-correlation detector.

As a method of maintaining good detection sensitivity while preventing the false detection, there has been proposed a method of setting the value of the threshold based on measured received power, or a method of normalizing the correlation value with the measured received power, and determining the presence or absence of the signal based on the normalized correlation value (for example, Patent Literature (hereinafter, abbreviated as PTL) 1).

FIG. 2 is a diagram provided for describing an auto-correlation detector disclosed in PTL 1. FIG. 2A illustrates the configuration of the auto-correlation detector in PTL 1. FIG. 2B is a diagram illustrating an image of a process in the auto-correlation detector. In a periodic signal of FIG. 2B, a part of a first period is denoted by S1, while a part of a second period is denoted by S2.

As illustrated in FIG. 2B, a correlation between a first signal and a second signal, which have been provided by distribution of a received signal, is obtained. Part S1 and part S2 of the first signal, as well as those of the second signal are targets to be processed in a correlation operation. Since the second signal, however, has been given a delay for one period of the periodic signal, the correlation operation for the first signal and the second signal is actually the correlation operation for part S2 of the first signal and part S1 of the second signal.

Meanwhile, since the targets to be processed in the correlation operation are part S1 and part S2 of the first signal, as well as those of the second signal, a power observation period to be used for the normalization is also a period corresponding to both S1 and S2. The correlation value is normalized with an average value of the power in the power observation period, and the presence or absence of the signal is determined based on the normalized correlation value.

CITATION LIST

Patent Literature

PTL 1
Japanese Patent Application Laid-Open No. 2004-221940.

SUMMARY OF INVENTION

Technical Problem

In the above described conventional auto-correlation detector, however, if the signal level fluctuates in the power observation period, an effect on the average value of the power is biased depending on timing in the observation period, and thus an effect on the correlation value normalized with the average value of the power is also biased depending on the timing. This results in a problem of degradation of signal detection accuracy.

FIG. 3 is a diagram provided for describing a phenomenon of the degradation of the signal detection accuracy. As illustrated in FIG. 3A, in the beginning part of a frame at which a state without a signal is switched to a state with the signal, the AGC operates, and thereby the level of the baseband signal extremely fluctuates after an AGC process. In other words, as illustrated in FIG. 3A, the level of the power typically increases in the beginning part of the frame, and then rapidly drops. Accordingly, the power level often rapidly fluctuates in the preamble part provided in the beginning part of the frame.

Here, the case of employing a periodic signal including two periods, as a preamble signal, will be considered. For simplicity, the signal level of the part of the first period of the periodic signal is assumed to be constant value A, while the signal level of the part of the second period thereof is assumed to be constant value B (B<A).

Average power P is obtained by $(A^2+B^2)/2$. Correlation value R is proportional to $A \cdot B$, and thus obtained by $r \cdot A \cdot B$ (r is a correlation coefficient). The normalized correlation value is obtained by R/P.

In the case of no fluctuation in the power level, A=B, and thus the normalized correlation value R/P is r. In contrast, if there are the fluctuations in the power level, for example, assuming A=10 and B=1, the normalized correlation value R/P is $r \cdot 10/50.5 \approx 0.2r$. In other words, if there are the fluctuations in the power level, the normalized correlation value is smaller relative to the case of no fluctuation in the power level, which leads to the degradation of the detection sensitivity.

An object of the present invention is to provide a signal detection apparatus and a signal detection method that can maintain the signal detection accuracy even in the case of large fluctuations in the power level.

Solution to Problem

To achieve the abovementioned object, a signal detection apparatus reflecting one aspect of the present invention includes a first multiplier that multiplies a first distributed signal provided by distribution of a received signal, by a first multiplication signal; a first integrator that integrates a result of the multiplication obtained in the first multiplier, in an integration period, and thereby calculates a first correlation value; a second multiplier that multiplies a second distributed signal provided by the distribution of the received signal, by a second multiplication signal; a second integrator that integrates a result of the multiplication obtained in the second multiplier, in the integration period, and thereby calculates a second correlation value; a delay section that delays the first distributed signal or the second distributed signal for time T1 to form the first multiplication signal, and delays the first distributed signal or the second distributed signal for time T2 (T2>T1) to form the second multiplication signal; and a determination section that determines presence or absence of a signal to be detected, based on the first correlation value and the second correlation value, the signal to be detected being a periodic signal with period T1 or a periodic signal with period T2.

To achieve the abovementioned object, a signal detection method reflecting one aspect of the present invention includes multiplying a first distributed signal provided by distribution of a received signal, by a first multiplication signal, integrating a result of the multiplication in an integration period, and thereby calculating a first correlation value; multiplying a second distributed signal provided by the distribution of the received signal, by a second multiplication signal, integrating a result of the multiplication in the integration period, and thereby calculating a second correlation value; delaying the first distributed signal or the second distributed signal for time T1 and thereby forming the first multiplication signal; delaying the first distributed signal or the second distributed signal for time T2 (T2>T1) and thereby forming the second multiplication signal; and determining presence or absence of a signal to be detected, based on the first correlation value and the second correlation value, the signal to be detected being a periodic signal with period T1 or a periodic signal with period T2.

Advantageous Effects of Invention

According to the present invention, there can be provided a signal detection apparatus and a signal detection method that can maintain the signal detection accuracy even in the case of the large fluctuations in the power level.

BRIEF DESCRIPTION OF DRAWINGS

FIG. 5 is a diagram provided for describing a signal detection process;

FIG. 8 is a block diagram illustrating the configuration of a determination section;

FIG. 9 is a diagram illustrating a distribution of a reference value;

DESCRIPTION OF EMBODIMENTS

Figure 1A:
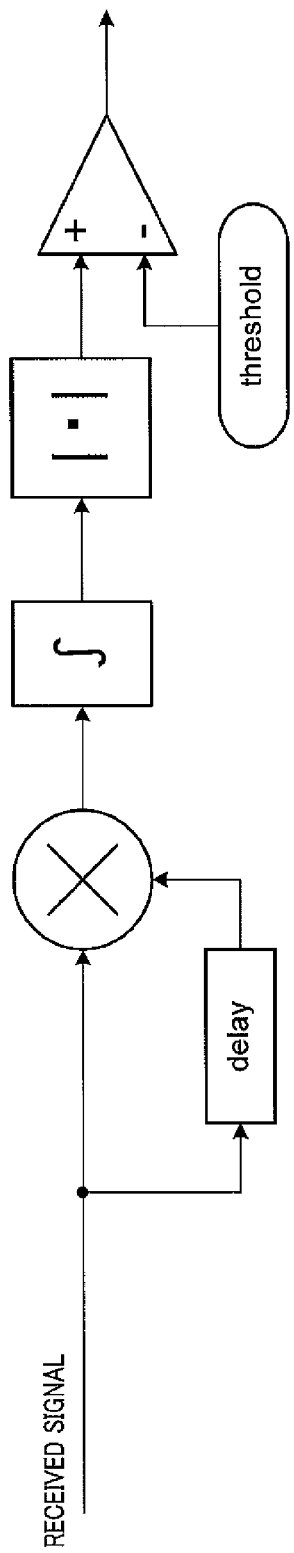
FIG. 1 is a diagram provided for describing an auto-correlation method.
Figure 1B:
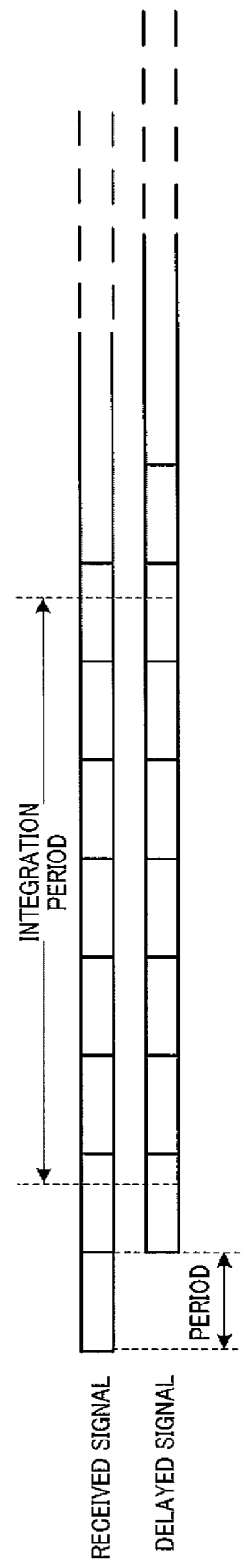
Figure 2A:
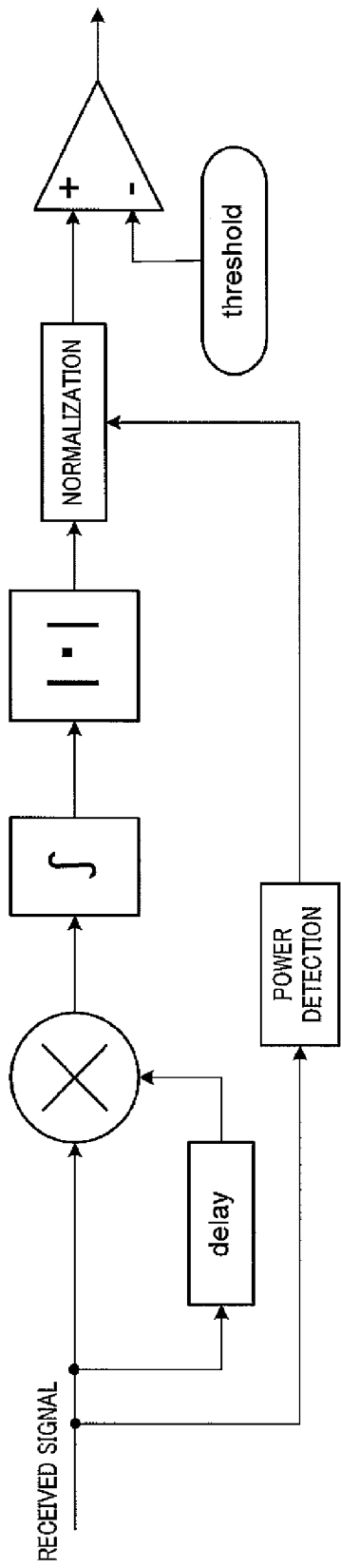
FIG. 2 is a diagram provided for describing a conventional auto-correlation detector.
Figure 2B:
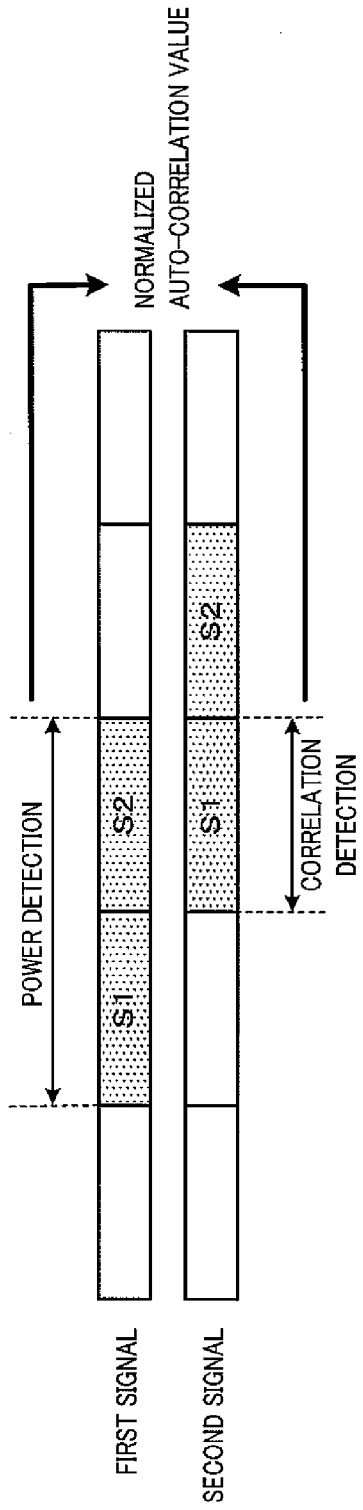
Figure 3A:
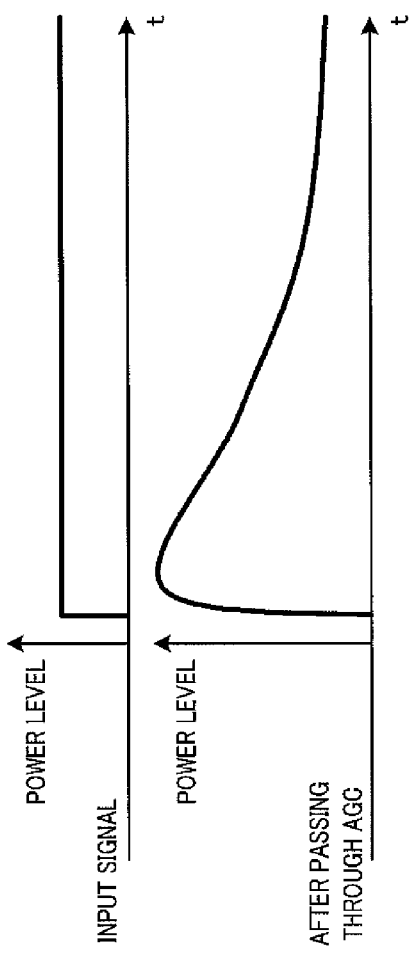
FIG. 3 is a diagram provided for describing a phenomenon of degradation of signal detection accuracy.
Figure 3B:
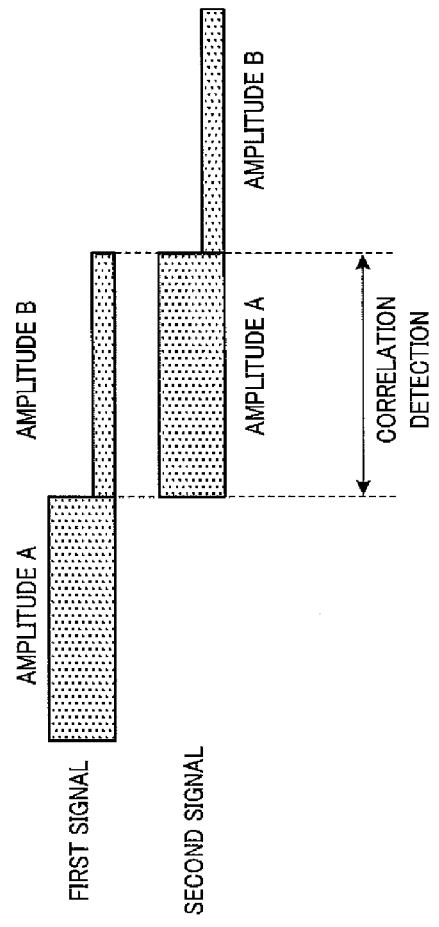

Embodiments of the present invention will be described in detail below with reference to the drawings. In the embodiments, the same components are assigned the same reference numerals or characters, and repeated descriptions thereof will be omitted.

Embodiment 1

Outline of System

Embodiments of the present invention presuppose circumstances where multiple communication systems corresponding to respective multiple millimeter wave wireless communication standards coexist. In each communication system, a transmission apparatus (for example, an access point) transmits a periodic signal placed in a preamble part. The periodic signal is set in each communication system. A signal detection apparatus according to Embodiment 1 of the present invention is included in a receiving apparatus (for example, a terminal apparatus) communicating in any of the above multiple communication systems.

The signal detection apparatus detects preamble signals from the multiple communication systems (hereinafter may be referred to as "other systems") other than the communication system (hereinafter may be referred to as "the system") with which the receiving apparatus including the signal detection apparatus communicates. It should be noted that while the following description presupposes that the signal detection apparatus detects the preamble signals from the multiple other systems, the preamble signals to be detected may include a preamble signal of the system.

[Configuration of Signal Detection Apparatus 100]

Figure 4:
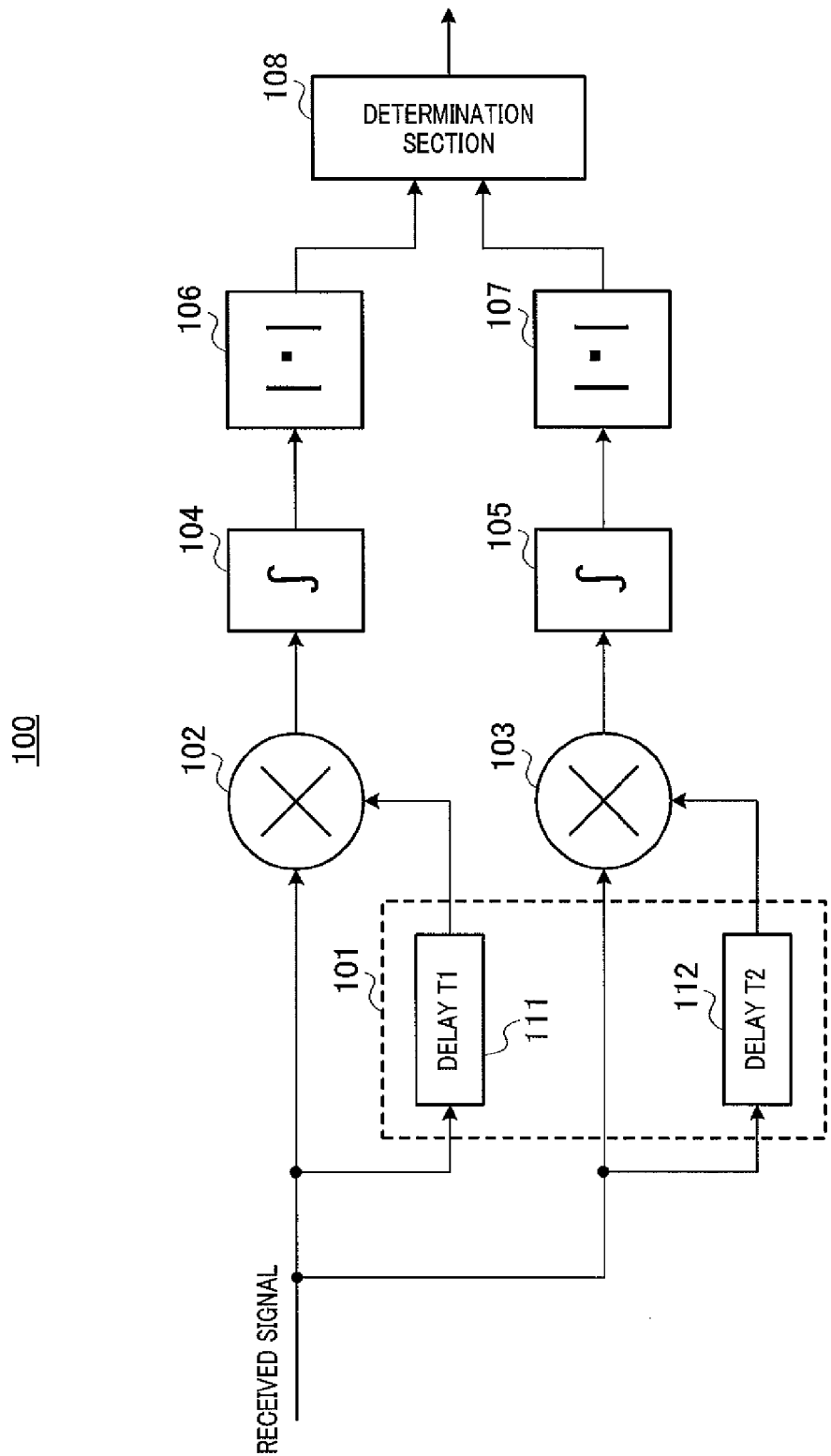
FIG. 4 is a block diagram illustrating the configuration of a signal detection apparatus according to Embodiment 1 of the present invention.

FIG. 4 illustrates the configuration of signal detection apparatus 100 according to Embodiment 1 of the present invention. As described above, signal detection apparatus 100 is included in the receiving apparatus communicating with any communication system in the multiple communication systems corresponding to the respective multiple millimeter wave wireless communication standards. Signal detection apparatus 100 takes a received signal (that is, a baseband signal) as input, which is obtained after wireless reception processes (for example, down conversion and analog-digital conversion) applied to a signal that has been wirelessly received via an antenna in the receiving apparatus. The received signal as input is distributed (that is, replicated) to form multiple distributed signals.

In FIG. 4, signal detection apparatus 100 includes delay section 101, multipliers 102 and 103, integrators 104 and 105, absolute value calculation sections 106 and 107, and determination section 108.

Multiplier 102 multiplies a first distributed signal by a first multiplication signal, and outputs a result of the multiplication to integrator 104.

Multiplier 103 multiplies a second distributed signal by a second multiplication signal, and outputs a result of the multiplication to integrator 105.

Integrator 104 integrates the multiplication result outputted from multiplier 102, in a predetermined period, and outputs a result of the integration (that is, a correlation value between the first distributed signal and the first multiplication signal (hereinafter may be referred to as "first correlation value")) to absolute value calculation section 106.

Integrator 105 integrates the multiplication result outputted from multiplier 103, in the predetermined period, and outputs a result of the integration (that is, a correlation value between the second distributed signal and the second multiplication signal (hereinafter may be referred to as "second correlation value")) to absolute value calculation section 107.

Absolute value calculation section 106 calculates an absolute value of the first correlation value, and outputs the absolute value to determination section 108.

Absolute value calculation section 107 calculates an absolute value of the second correlation value, and outputs the absolute value to determination section 108.

Delay section 101 uses at least one of the multiple distributed signals to form the first multiplication signal and the second multiplication signal. Specifically, delay section 101 includes delay device 111 and delay device 112. Delay device 111 forms the first multiplication signal by performing a process for delaying a signal provided by further distribution of the first distributed signal, for T1, and outputs the first multiplication signal to multiplier 102. Delay device 112 forms the second multiplication signal by performing a process for delaying a signal provided by further distribution of the second distributed signal, for T2, and outputs the second multiplication signal to multiplier 103.

In other words, the first multiplication signal is relatively shifted from the second multiplication signal by (T2−T1). Here, T1 and T2 correspond to respective periods of periodic signals used in preamble signals to be detected by signal detection apparatus 100. It is presupposed that T2>T1 and T1>(T2−T1).

Determination section 108 determines the presence or absence of the preamble signal to be detected, based on the absolute value (R1) of the first correlation value that has been obtained in absolute value calculation section 106, and based on the absolute value (R2) of the second correlation value that has been obtained in absolute value calculation section 107.

Specifically, determination section 108 determines the presence or absence of the preamble signal to be detected, based on a magnitude relationship between a relative value, which is between the absolute value (R1) of the first correlation value and the absolute value (R2) of the second correlation value, and a signal detection determining threshold.

In particular, if R1/R2 is equal to or larger than the signal detection determining threshold, determination section 108 determines that the preamble signal including the periodic signal with period T1 has been detected. In contrast, if R2/R1 is equal to or larger than the signal detection determining threshold, determination section 108 determines that the preamble signal including the periodic signal with period T2 has been detected.

If both R1/R2 and R2/R1 are less than the signal detection determining threshold, determination section 108 determines that neither the preamble signal including the periodic signal with period T1 nor the preamble signal including the periodic signal with period T2 has been detected.

It should be noted that while a ratio of the absolute value (R1) of the first correlation value to the absolute value (R2) of the second correlation value is used as the relative value between the both values, the present invention is not limited thereto, and a difference between the both values may be used as the relative value. In other words, if R1−R2 is equal to or larger than the signal detection determining threshold, determination section 108 determines that the preamble signal including the periodic signal with period T1 has been detected. R2 is used as a reference value.

If R2−R1 is equal to or larger than the signal detection determining threshold, determination section 108 determines that the preamble signal including the periodic signal with period T2 has been detected. R1 is used as the reference value. If the difference between R1 and R2 (|R1−R2|) is less than the signal detection determining threshold, determination section 108 determines that neither the preamble signal including the periodic signal with period T1 nor the preamble signal including the periodic signal with period T2 has been detected.

If R1 and R2 are represented in true values, the ratio of the both values is normally used as the relative value. If R1 and R2 are represented in logarithmic values in decibels, for example, the difference between the both values is appropriately used as the relative value.

[Operations of Signal Detection Apparatus 100]

Operations of signal detection apparatus 100 having the above configuration will be described. FIG. 5 is a diagram provided for describing a signal detection process in signal detection apparatus 100.

FIG. 5A is a diagram illustrating an image of a correlation detection process in the case where the preamble signal including the periodic signal with period T1 has been received.

There is a relative shift by T1 between the first distributed signal and the first multiplication signal, which are used in the multiplication in multiplier 102. In the state where timing of the beginning of a signal for one period (T1) included in the periodic signal matches thereto, the first distributed signal is multiplied by the first multiplication signal (see the upper diagram of FIG. 5A). Accordingly, the resultant correlation value in integrator 104 becomes large.

There is a relative shift by T2 between the second distributed signal and the second multiplication signal, which are used in the multiplication in multiplier 103. In the state where the timing of the beginning of the signal for one period (T1) included in the periodic signal is shifted therefrom, the second distributed signal is multiplied by the second multiplication signal (see the lower diagram of FIG. 5A). Accordingly, the resultant correlation value in integrator 105 becomes small.

A value of R1/R2 also becomes large, and thus becomes larger than the signal detection determining threshold. Accordingly, determination section 108 determines that the preamble signal including the periodic signal with period T1 has been detected.

FIG. 5B is a diagram illustrating an image of the correlation detection process in the case where the preamble signal including the periodic signal with period T2 has been received.

There is the relative shift by T1 between the first distributed signal and the first multiplication signal, which are used in the multiplication in multiplier 102. In the state where timing of the beginning of a signal for one period (T2) included in the periodic signal is shifted therefrom, the first distributed signal is multiplied by the first multiplication signal (see the upper diagram of FIG. 5B). Accordingly, the resultant correlation value in integrator 104 becomes small.

There is the relative shift by T2 between the second distributed signal and the second multiplication signal, which are used in the multiplication in multiplier 103. In the state where the timing of the beginning of the signal for one period (T2) included in the periodic signal matches thereto, the second distributed signal is multiplied by the second multiplication signal (see the lower diagram of FIG. 5B). Accordingly, the resultant correlation value in integrator 105 becomes large.

A value of R2/R1 also becomes large, and thus becomes larger than the signal detection determining threshold. Accordingly, determination section 108 determines that the preamble signal including the periodic signal with period T2 has been detected.

If an interference signal from a heterogeneous system has been thus detected, the receiving apparatus starts an operation for avoiding interference, depending on the level or the frequency of the detection. General operations for avoiding the interference, for example, include changing a frequency channel, changing transmission timing, controlling transmission power, and controlling antenna directivity.

According to the present embodiment, in signal detection apparatus 100, multiplier 102 multiplies the first distributed signal provided by the distribution of the received signal, by the first multiplication signal; and integrator 104 integrates the multiplication result obtained in multiplier 102, in an integration period, and thereby calculates the first correlation value. Multiplier 103 multiplies the second distributed signal provided by the distribution of the received signal, by the second multiplication signal; and integrator 105 integrates the multiplication result obtained in multiplier 103, in the integration period, and thereby calculates the second correlation value.

Delay section 101 delays the first distributed signal or the second distributed signal for time T1 to form the first multiplication signal. In addition, delay section 101 delays the first distributed signal or the second distributed signal for time T2 (T2>T1) to form the second multiplication signal. Determination section 108 determines the presence or absence of the signal to be detected, which is the periodic signal with period T1 or the periodic signal with period T2, based on the first correlation value and the second correlation value.

In other words, signal detection apparatus 100 performs the determination of the signal detection based on the first correlation value and the second correlation value, which have been obtained by an auto-correlation process using each of the first multiplication signal and the second multiplication signal that are relatively shifted from each other by (T2−T1). Even if there are large fluctuations in the level of power in the received signal, the signal detection can be determined based on the first correlation value and the second correlation value in which the fluctuations in the received signal have been reflected. Accordingly, signal detection accuracy can be maintained even in the case of the large fluctuations in the power level.

Specifically, determination section 108 determines the presence or absence of the signal to be detected, based on a relative value between the first correlation value and the second correlation value, and based on the signal detection determining threshold. The relative value between the first correlation value and the second correlation value is a ratio of the first correlation value to the second correlation value, or a difference between the first correlation value and the second correlation value.

Figure 6:
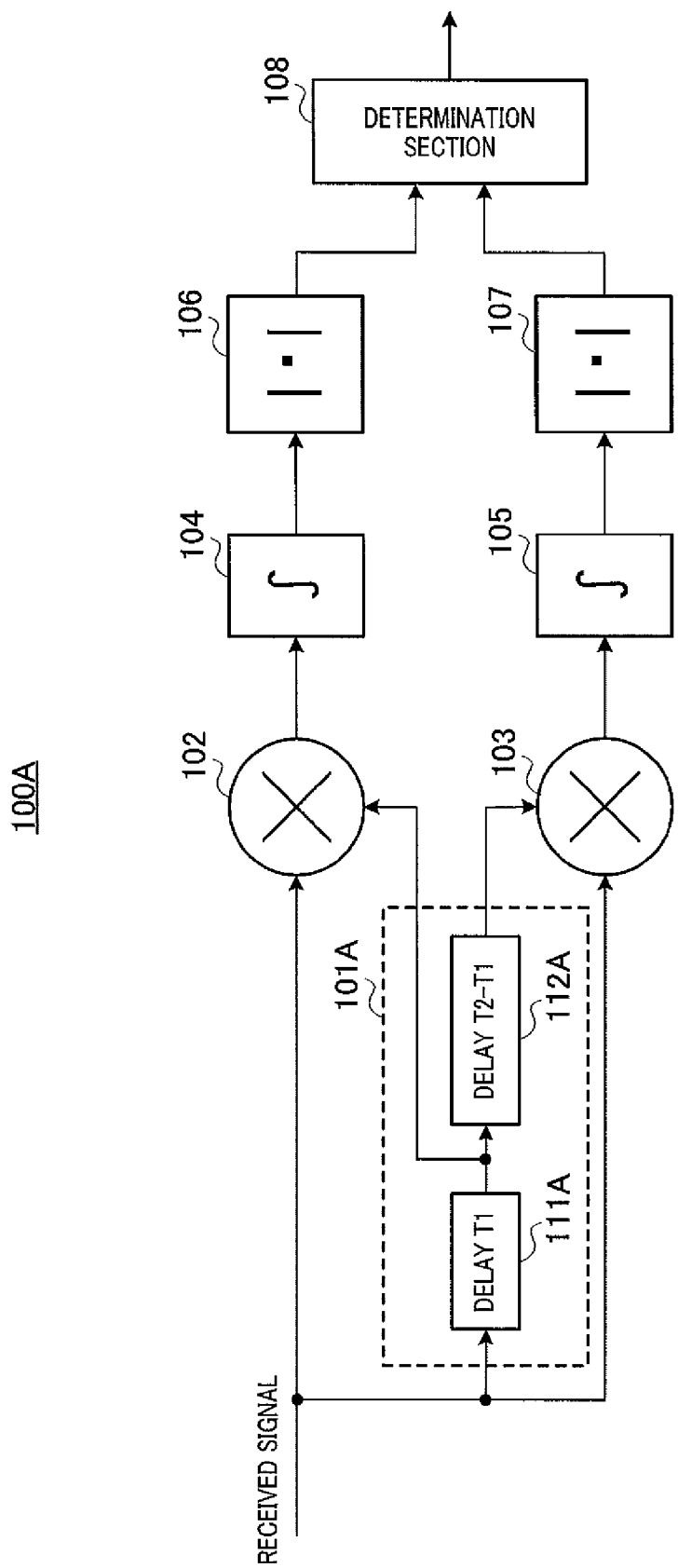
FIG. 6 is a diagram illustrating a variation of the configuration of a delay section.

It should be noted that the configuration of delay section 101 as described above is an example, and may be the configuration illustrated in FIG. 6, for example. FIG. 6 illustrates the configuration of signal detection apparatus 100A including delay section 101A. In FIG. 6, delay section 101A includes delay device 111A and delay device 112A. Delay device 111A obtains a signal by performing a process for delaying the signal provided by the further distribution of the second distributed signal, for T1, and outputs the obtained signal as the first multiplication signal to multiplier 102, and also to delay device 112A.

Delay device 112A obtains a signal by performing a process for delaying the signal outputted from delay device 111A, for (T2−T1), and outputs the obtained signal as the second multiplication signal to multiplier 103. In other words, the second multiplication signal inputted to multiplier 103 has been delayed for a total of T2.

A part of the delay device is shared by two systems that perform the auto-correlation process, which can reduce the size of a circuit. The part of the delay device can be similarly shared even by three or more systems that perform the auto-correlation process. A group of delay devices having total delay time corresponding to the longest period in the periodic signals to be detected may be provided.

Embodiment 2

Figure 7:
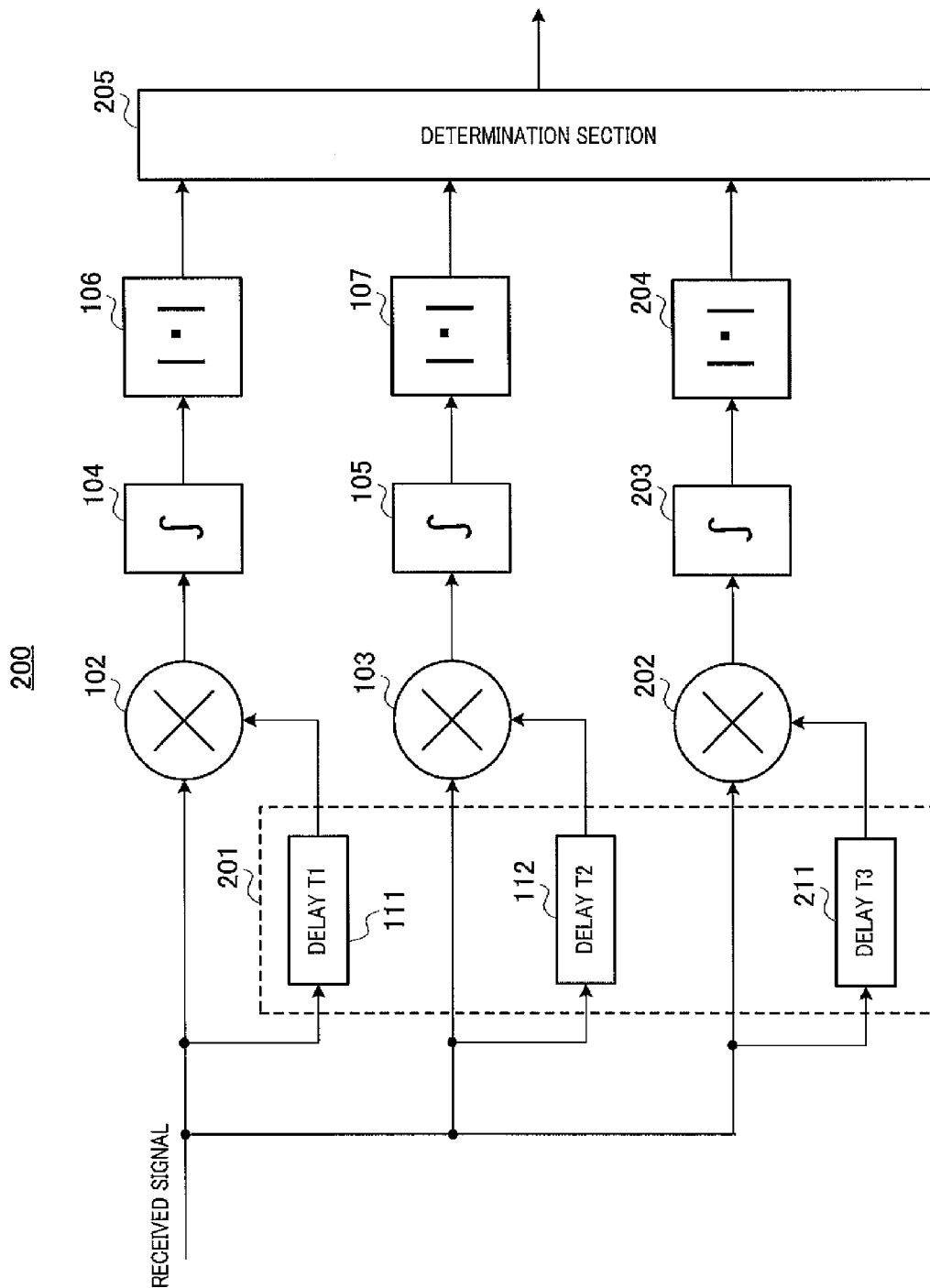
FIG. 7 is a block diagram illustrating the configuration of the signal detection apparatus according to Embodiment 2 of the present invention.

FIG. 7 illustrates the configuration of signal detection apparatus 200 according to Embodiment 2 of the present invention. In FIG. 7, signal detection apparatus 200 includes delay section 201, multiplier 202, integrator 203, absolute value calculation section 204, and determination section 205. Delay section 201 includes delay device 111, delay device 112 and delay device 211.

Multiplier 202 multiplies a third distributed signal by a third multiplication signal, and outputs a result of the multiplication to integrator 203.

Integrator 203 integrates the multiplication result outputted from multiplier 202, in the predetermined period, and outputs a result of the integration (that is, a correlation value between the third distributed signal and the third multiplication signal (hereinafter may be referred to as "third correlation value")) to absolute value calculation section 204.

Absolute value calculation section 204 calculates an absolute value of the third correlation value, and outputs the absolute value to determination section 205.

Delay section 201 uses at least one of the multiple distributed signals to form the first multiplication signal, the second multiplication signal, and third multiplication signal. Specifically, delay device 211 forms the third multiplication signal by performing a process for delaying a signal provided by further distribution of the third distributed signal, for T3, and outputs the third multiplication signal to multiplier 202.

In other words, the first multiplication signal is relatively shifted from the second multiplication signal by (T2−T1). The first multiplication signal is relatively shifted from the third multiplication signal by (T3−T1). The second multiplication signal is relatively shifted from the third multiplication signal by (T3−T2).

Here, T1, T2 and T3 correspond to the respective periods of the periodic signals used in the preamble signals to be detected by signal detection apparatus 200. It is presupposed that all of T3>T2>T1, T1>(T2−T1), T1>(T3−T1) and T2>(T3−T2) are satisfied.

Determination section 205 determines the presence or absence of the preamble signal to be detected, based on the absolute value (R1) of the first correlation value, the absolute value (R2) of the second correlation value, and the absolute value (R3) of the third correlation value. Specifically, determination section 205 determines the presence or absence of the preamble signal to be detected, based on an average value of each pair including two of the absolute value (R1) of the first correlation value, the absolute value (R2) of the second correlation value and the absolute value (R3) of the third correlation value, and based on the absolute value of one remaining correlation value that is not included in each pair.

FIG. 8 illustrates the configuration of determination section 205. In FIG. 8, determination section 205 includes determination unit 221, determination unit 222, and determination unit 223. Determination unit 221 includes averaging section 231 and determination processing section 232. Determination unit 222 includes averaging section 241 and determination processing section 242. Determination unit 223 includes averaging section 251 and determination processing section 252.

Determination unit 221 determines whether or not the preamble signal including the periodic signal with period T1 has been detected, based on the absolute value (R1) of the first correlation value, and based on an average value of the absolute value (R2) of the second correlation value and the absolute value (R3) of the third correlation value.

Specifically, in determination unit 221, averaging section 231 calculates the average value of the absolute value (R2) of the second correlation value and the absolute value (R3) of the third correlation value. Determination processing section 232 determines whether or not the preamble signal including the periodic signal with period T1 has been detected, based on a ratio of the absolute value (R1) of the first correlation value to the average value of the absolute value (R2) of the second correlation value and the absolute value (R3) of the third correlation value (that is, the reference value), or based on a difference between them.

In other words, if the ratio of the absolute value (R1) of the first correlation value to the reference value (that is, R1/the reference value), or the difference between them (that is R1−the reference value) is equal to or larger than the signal detection determining threshold, determination unit 221 determines that the preamble signal including the periodic signal with period T1 has been detected.

Each of determination unit 222 and determination unit 223 has the same configuration as that of determination unit 221. In determination unit 222, however, an average value of the absolute value (R1) of the first correlation value and the absolute value (R3) of the third correlation value is calculated, and the determination of the signal detection is performed based on the average value calculated in determination unit 222, and based on the absolute value (R2) of the second correlation value.

In determination unit 223, an average value of the absolute value (R1) of the first correlation value and the absolute value (R2) of the second correlation value is calculated, and the determination of the signal detection is performed based on the average value calculated in determination unit 223, and based on the absolute value (R3) of the third correlation value.

Here, if the level of the reference value to be used for obtaining the ratio or the difference as above happens to be a small value close to zero, the value of the ratio or the difference may become large even with no periodic signal included in the received signal. Since the value of the ratio or the difference exceeds the threshold, the preamble signal may be incorrectly detected even with no periodic signal included in the received signal.

Conversely, if the level of the reference value becomes larger than the average level, the value of the ratio or the difference may become small even with the periodic signal included in the received signal. Since the value of the ratio or the difference is below the threshold, it may be determined that the preamble signal has not been detected even with the periodic signal included in the received signal.

As in Embodiment 1, if the reference value to be used for obtaining the ratio or the difference is one correlation value obtained from one correlation processing system, the reference value, for example, may vary depending on an effect of noise. A distribution of the reference value is as illustrated in FIG. 9A. A probability of the level of the reference value being close to zero, and a probability of the level of the reference value being larger than the average level cannot be easily ignored. False detection or sensitivity degradation may consequently occur.

In contrast, as in the present embodiment, if an average value of multiple correlation values obtained by multiple correlation processing systems is used as the reference value, the variation in the level of the reference value becomes small as illustrated in FIG. 9B, A probability of the level of the reference value being a small value close to zero particularly decreases, which can thus decrease a probability of the false detection.

According to the present embodiment, in signal detection apparatus 200, determination section 205 determines the presence or absence of the signal to be detected, which is the periodic signal with period T1, the periodic signal with period T2, or the periodic signal with period T3, based on an average value of each pair including two of the first correlation value, the second correlation value and the third correlation value, and based on one remaining correlation value that is not included in each pair.

The presence or absence of the signal to be detected can be determined with the average value of each pair as the reference value. A distribution of the average value of each pair is narrower than that of one correlation value. The use of the average value of each pair as the reference value can prevent the false detection or the sensitivity degradation.

It should be noted that the case of using three kinds of correlation values has been described in the present embodiment, which, however, is also extensible to the case of using four or more kinds of correlation values. In the determination of the periodic signal with period T1, for example, the reference value can be an average value of absolute values of three or more kinds of correlation values other than the first correlation value.

In other words, the reference value can be an average value of absolute values of at least two or more correlation values in the four or more kinds of correlation values. As the number of the correlation values to be used for the reference value increases, the variation in the level of the reference value can be reduced.

While the average value of the absolute values of the correlation values is used as the reference value, a variety of variations of specific processes may be employed in a range of implementing a function for the purpose of reducing the variation by an averaging operation. An average value of the squares of the absolute values of the correlation values (so-called mean square), for example, may be used as the reference value, and compared with the square of an absolute value of a correlation value of a period desired to be determined.

Embodiment 3

Figure 10:
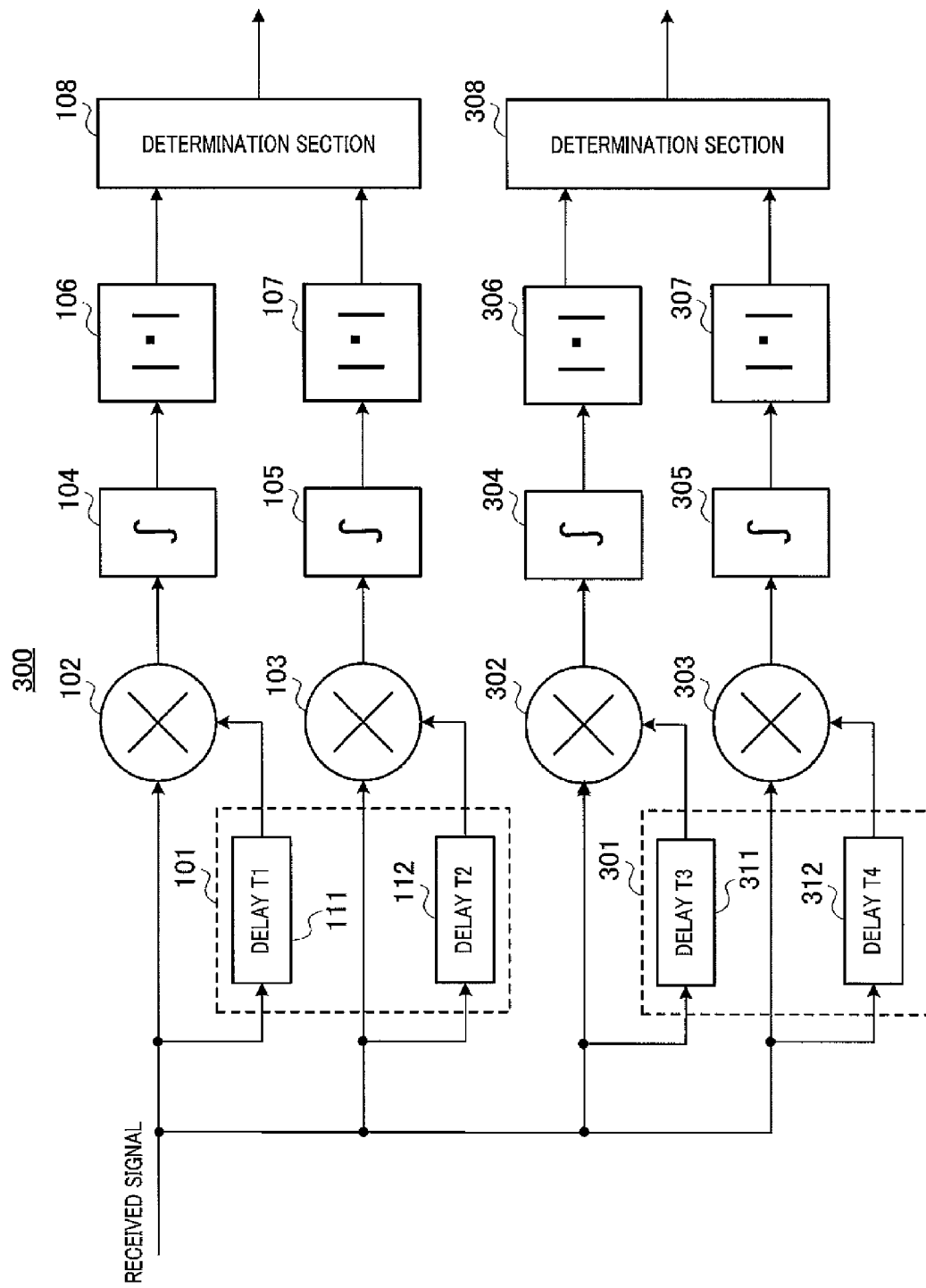
FIG. 10 is a block diagram illustrating the configuration of the signal detection apparatus according to Embodiment 3 of the present invention.

FIG. 10 illustrates the configuration of signal detection apparatus 300 according to Embodiment 3 of the present invention. In FIG. 10, signal detection apparatus 300 includes delay section 301, multipliers 302 and 303, integrators 304 and 305, absolute value calculation sections 306 and 307, and determination section 308.

Multiplier 302 multiplies the third distributed signal by the third multiplication signal, and outputs a result of the multiplication to integrator 304.

Multiplier 303 multiplies a fourth distributed signal by a fourth multiplication signal, and outputs a result of the multiplication to integrator 305.

Integrator 304 integrates the multiplication result outputted from multiplier 302, in the predetermined period, and outputs a result of the integration (that is, the correlation value between the third distributed signal and the third multiplication signal (hereinafter may be referred to as "third correlation value")) to absolute value calculation section 306.

Integrator 305 integrates the multiplication result outputted from multiplier 303, in the predetermined period, and outputs a result of the integration (that is, a correlation value between the fourth distributed signal and the fourth multiplication signal (hereinafter may be referred to as "fourth correlation value")) to absolute value calculation section 307.

Absolute value calculation section 306 calculates the absolute value of the third correlation value, and outputs the absolute value to determination section 308.

Absolute value calculation section 307 calculates an absolute value of the fourth correlation value, and outputs the absolute value to determination section 308.

Delay section 301 uses at least one of the multiple distributed signals to form the third multiplication signal and the fourth multiplication signal. Specifically, delay section 301 includes delay device 311 and delay device 312. Delay device 311 forms the third multiplication signal by performing the process for delaying the signal provided by the further distribution of the third distributed signal, for T3, and outputs the third multiplication signal to multiplier 302. Delay device 312 forms the fourth multiplication signal by performing a process for delaying a signal provided by further distribution of the fourth distributed signal, for T4, and outputs the fourth multiplication signal to multiplier 303.

In other words, the third multiplication signal is relatively shifted from the fourth multiplication signal by (T4−T3). Here, T3 and T4 correspond to respective periods of periodic signals used in preamble signals to be detected by signal detection apparatus 300. It is presupposed that all of T4>T3>T2>T1, T1>(T2−T1) and T3>(T4−T3) are satisfied.

Determination section 308 determines the presence or absence of the preamble signal to be detected, based on the absolute value (R3) of the third correlation value that has been obtained in absolute value calculation section 306, and based on the absolute value (R4) of the fourth correlation value that has been obtained in absolute value calculation section 307.

Specifically, determination section 308 determines the presence or absence of the preamble signal to be detected, based on a magnitude relationship between a relative value, which is between the absolute value (R3) of the third correlation value and the absolute value (R4) of the fourth correlation value, and the signal detection determining threshold.

In particular, if R3/R4 is equal to or larger than the signal detection determining threshold, determination section 308 determines that the preamble signal including the periodic signal with period T3 has been detected. In contrast, if R4/R3 is equal to or larger than the signal detection determining threshold, determination section 308 determines that the preamble signal including the periodic signal with period T4 has been detected.

If both R3/R4 and R4/R3 are less than the signal detection determining threshold, determination section 308 determines that neither the preamble signal including the periodic signal with period T3 nor the preamble signal including the periodic signal with period T4 has been detected.

It should be noted that while a ratio of the absolute value (R3) of the third correlation value to the absolute value (R4) of the fourth correlation value is used here as the relative value between the both values, the present invention is not limited thereto, and a difference between the both values may be used as the relative value, similarly to Embodiment 1.

While delay section 101 and delay section 301 have been described above as separate functional sections, the present invention is not limited thereto, and they may be a single functional section. Determination section 108 and determination section 308 may also be a single functional section.

According to the present embodiment, in signal detection apparatus 300, determination section 108 determines the presence or absence of the signal to be detected, which is the periodic signal with period T1 or the periodic signal with period T2, based on the first correlation value and the second correlation value, while determination section 308 determines the presence or absence of the signal to be detected, which is the periodic signal with period T3 or the periodic signal with period T4, based on the third correlation value and the fourth correlation value. The length of the period increases in the order of period T1, period T2, period T3 and period T4.

Since the presence or absence of the signal to be detected can be determined for a pair including the signals to be detected having the similar length of the periods, capability of following the level fluctuations in a short time can be improved.

Embodiment 4

Figure 11:
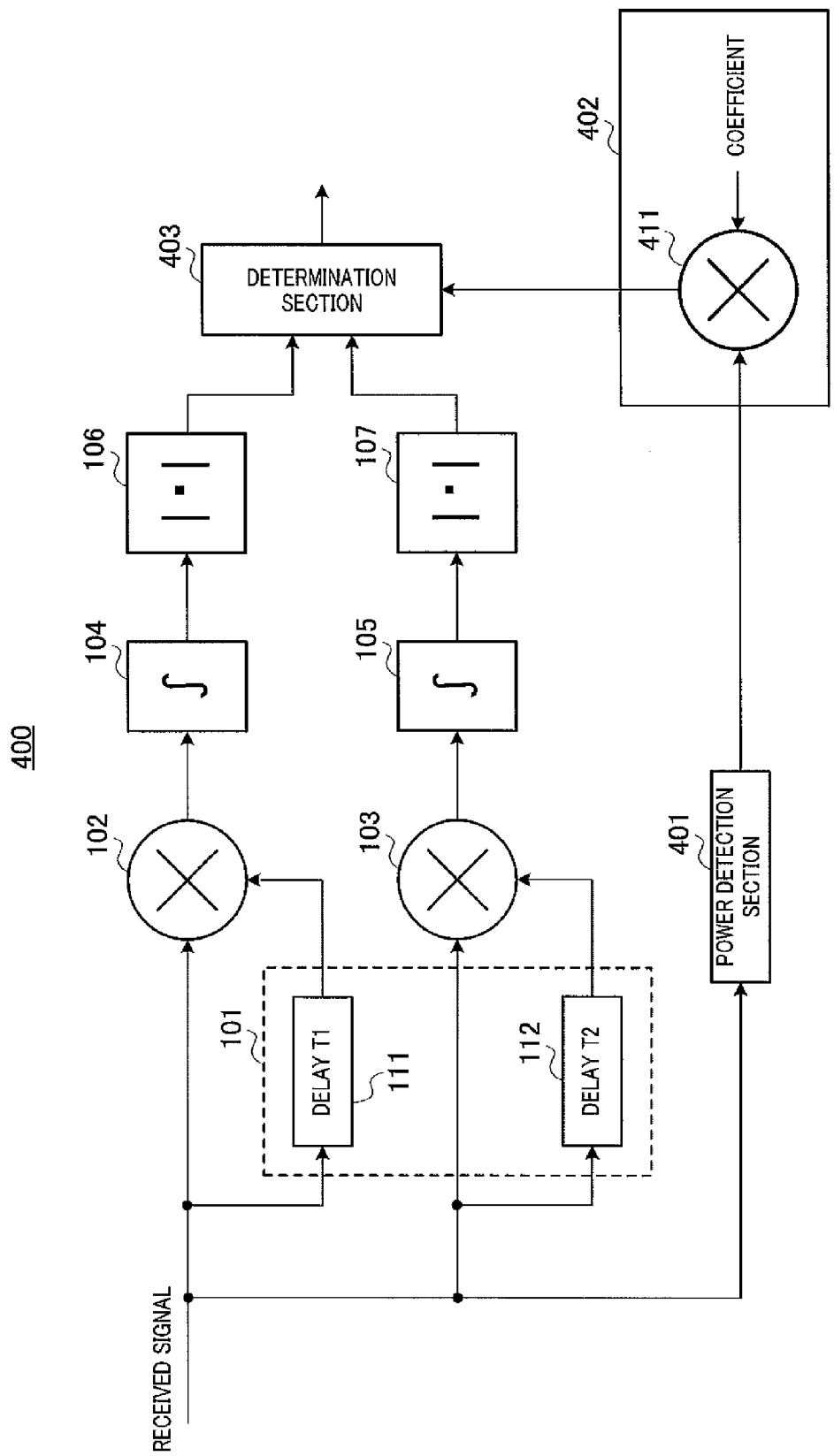
FIG. 11 is a block diagram illustrating the configuration of the signal detection apparatus according to Embodiment 4 of the present invention.

FIG. 11 illustrates the configuration of signal detection apparatus 400 according to Embodiment 4 of the present invention. In FIG. 11, signal detection apparatus 400 includes power detection section 401, threshold generation section 402, and determination section 403.

Power detection section 401 detects the power of the received signal, and outputs a value of the detected power to threshold generation section 402. A method similar to the above described PTL 1 is employed for the power detection in power detection section 401. In other words, power detection section 401 outputs an average value of the power in a power observation period corresponding to a part to be processed in a correlation operation (that is, corresponding to the period corresponding to both S1 and S2 in Background Art).

Threshold generation section 402 generates a second signal detection determining threshold, based on the detected power value. Specifically, threshold generation section 402 includes multiplier 411. Multiplier 411 multiplies the detected power value by a predetermined coefficient, and thereby generates a threshold for determining whether to execute a process.

Determination section 403 determines whether or not to execute a determination process (described in Embodiment 1) for determining the presence or absence of the preamble signal to be detected, based on a magnitude relationship between each of the absolute value (R1) of the first correlation value and the absolute value (R2) of the second correlation value, and the threshold for determining whether to execute the process.

In other words, if the absolute value (R1) of the first correlation value is equal to or larger than the threshold for determining whether to execute the process, determination section 403 compares and determines the magnitude of R1/R2 and the signal detection determining threshold. If the absolute value (R2) of the second correlation value is equal to or larger than the threshold for determining whether to execute the process, determination section 403 compares and determines the magnitude of R2/R1 and the signal detection determining threshold.

According to the present embodiment, in signal detection apparatus 400, determination section 403 determines whether or not to execute the determination process for determining the presence or absence of the preamble signal to be detected, based on the magnitude relationship between each of the absolute value (R1) of the first correlation value and the absolute value (R2) of the second correlation value, and the threshold for determining whether to execute the process.

If each of the absolute value (R1) of the first correlation value and the absolute value (R2) of the second correlation value, which are used as the reference values, is small, the process for determining the presence or absence of the preamble signal to be detected is not executed.

If each of the absolute value (R1) of the first correlation value and the absolute value (R2) of the second correlation value, which are used as the reference values, is small, the false detection is likely to occur as described above. Accordingly, if each of the absolute value (R1) of the first correlation value and the absolute value (R2) of the second correlation value is small, the above determination process is not executed, and thus any unnecessary process can be prevented.

It should be noted that, in the above description, the magnitude relationship between each of the absolute value (R1) of the first correlation value and the absolute value (R2) of the second correlation value, and the threshold for determining whether to execute the process, is used as a criterion for determining whether or not to execute the determination process for the presence or absence of the preamble signal.

The present invention, however, is not limited thereto, and the magnitude relationship between each of the absolute value (R1) of the first correlation value and the absolute value (R2) of the second correlation value, and the threshold for determining whether to execute the process, may be used as a criterion for determining whether or not to regard the determination result as an effective result, after the determination of the presence or absence of the preamble signal.

In short, determination section 403 may determine the presence or absence of the preamble signal to be detected, based on a magnitude relationship between each of the absolute value (R1) of the first correlation value and the absolute value (R2) of the second correlation value, and the second signal detection determining threshold, as well as based on a magnitude relationship between the relative value, which is between the absolute value (R1) of the first correlation value and the absolute value (R2) of the second correlation value, and a first signal detection determining threshold (the same threshold as that used in Embodiment 1).

The above described configuration includes power detection section 401 and threshold generation section 402, in addition to the configuration of signal detection apparatus 100 described in Embodiment 1. The configuration, however, is not limited thereto, and a technique described in the present embodiment is also applicable to each of Embodiments 2 and 3.

OTHER EMBODIMENTS (1) In each of the above described embodiments, basically, the presence or absence of the preamble signal is determined based on the correlation value obtained in each of the two systems that perform the auto-correlation process. The signal detection accuracy can be maintained even in the case of the large fluctuations in the power level. A similar advantageous effect, however, can be obtained by signal detection apparatus 500 having the configuration as illustrated in FIG. 12.

Figure 12:
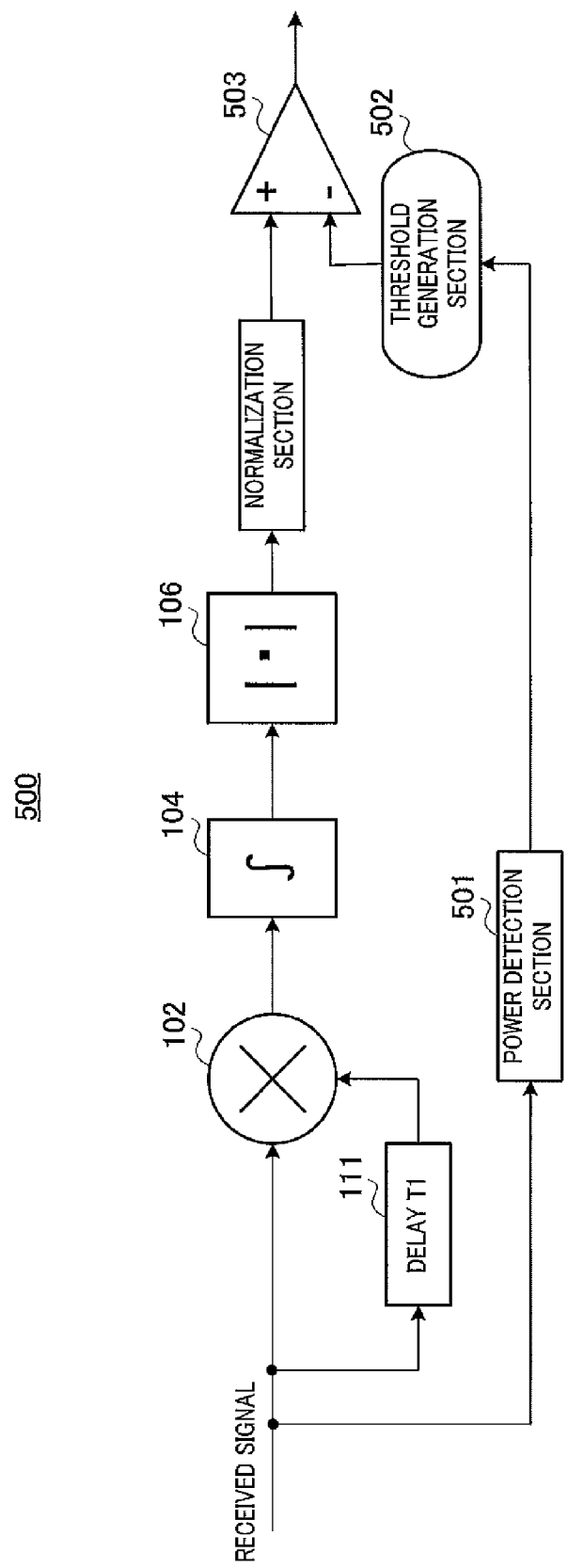
FIG. 12 is a block diagram illustrating the configuration of the signal detection apparatus according to another embodiment.

In FIG. 12, signal detection apparatus 500 includes power detection section 501, threshold generation section 502, and comparator 503.

Power detection section 501 detects the power of the received signal, similarly to power detection section 401 in Embodiment 4. Power detection section 501, however, calculates the average power with a geometric mean, unlike power detection section 401.

Power detection section 501 first calculates the average power in each of a first period and a second period, each of which is a period corresponding to one period of the periodic signal and included in the power observation period.

Power detection section 501 calculates a geometric mean of the average power calculated in the first period and the average power calculated in the second period. A value of the calculated geometric mean is outputted to threshold generation section 502.

Threshold generation section 502 generates the signal detection determining threshold, based on the detected power value.

Comparator 503 determines the presence or absence of the preamble signal to be detected, based on the first correlation value and the signal detection determining threshold, which has been generated by threshold generation section 502.

Figure 13:
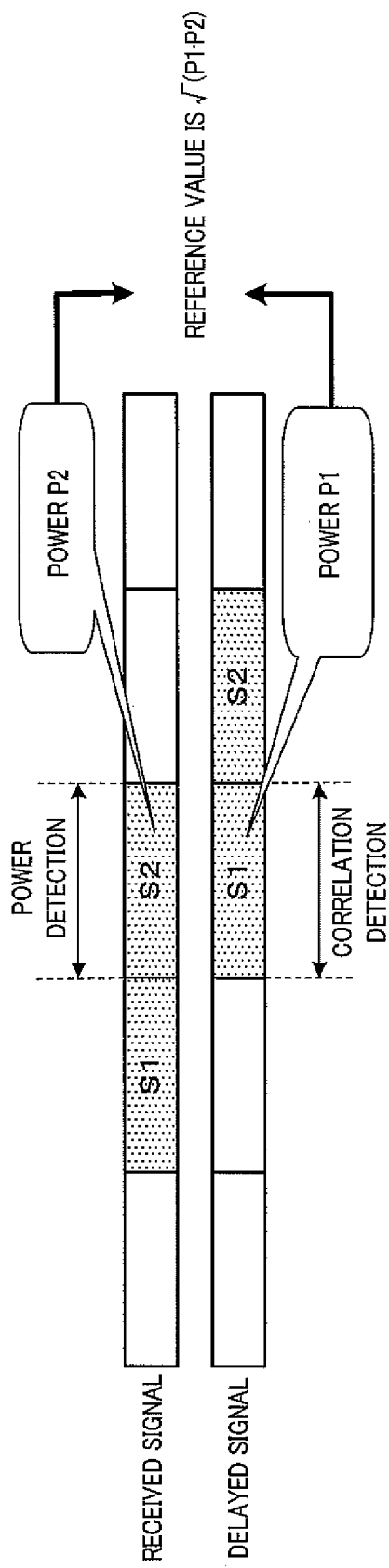
FIG. 13 is a diagram provided for describing operations of the signal detection apparatus.

Operations of signal detection apparatus 500 having the above configuration will be described. FIG. 13 is a diagram provided for describing the operations of signal detection apparatus 500.

As illustrated in FIG. 13, power detection section 501 separately calculates average power P1 in period S1 and average power P2 in period S2, and further calculates the geometric mean of average power P1 and average power P2, instead of averaging the power for periods S1 and S2 of signals.

Here, assuming that the amplitude of part S1 is A and the amplitude of part S2 is B, the geometric mean and correlation value R can be obtained as follows.

$$\text{Geometric mean} = \sqrt{(A^2 \cdot B^2)} = A \cdot B$$

Correlation value $R = r \cdot A \cdot B$ (r is a correlation coefficient)

Both the geometric mean and correlation value R are values proportional to a product A·B of amplitude A and amplitude B. A ratio of the geometric mean to correlation value R is always r.

In other words, both if a value of A equals to a value of B, and if both values are different due to the level fluctuations, a relative relationship between the geometric mean of the power and correlation value R is maintained. Accordingly, the capability of following the fluctuations in the power level can be improved by performing the signal detection based on the signal detection determining threshold, which is generated based on the geometric mean of average power P1 and average power P2.

It should be noted that power detection section 501 may be provided in signal detection apparatus 400 in Embodiment 4, instead of power detection section 401. The capability of following the fluctuations in the power level can thereby be further improved in signal detection apparatus 400.

(2) Although the above each embodiment has been explained using a case where the claimed invention is implemented with hardware, as an example, the claimed invention can be implemented with software.

Furthermore, each function block employed in the explanation of the above each embodiment may typically be implemented as an LSI constituted by an integrated circuit. These function blocks may be individual chips or partially or totally contained on a single chip. The term "LSI" is adopted herein but this may also be referred to as "IC," "system LSI," "super LSI," or "ultra LSI," depending on the differing extents of integration.

The method of implementing integrated circuit is not limited to LSI, and implementation by means of dedicated circuitry or a general-purpose processor may also be possible. After LSI manufacture, utilization of a field programmable gate array (FPGA) or a reconfigurable processor where connections and settings of circuit cells in an LSI can be reconfigured is also possible.

If a new integrated circuit implementation technology replacing LSI is introduced because of advancement in semiconductor technology or a different technology derived therefrom, the function blocks may of course be integrated using that technology. For example, application of biotechnology is possible.

The disclosure of Japanese Patent Application No. 2011-077441, filed on Mar. 31, 2011, including the specification, drawings and abstract, is incorporated herein by reference in its entirety.

INDUSTRIAL APPLICABILITY

The signal detection apparatus and the signal detection method of the present invention are useful as a signal detection apparatus and a signal detection method that can maintain the signal detection accuracy even in the case of the large fluctuations in the power level.

REFERENCE SIGNS LIST

100, 100A, 200, 300, 400, 500 Signal detection apparatus
101, 101A, 201, 301 Delay section
102, 103, 202, 302, 303 Multiplier
104, 105, 203, 304, 305 Integrator
106, 107, 204, 306, 307 Absolute value calculation section
108, 205, 308, 403 Determination section
111, 111A, 112, 112A, 211, 311, 312 Delay device
221, 222, 223 Determination unit
231, 241, 251 Averaging section
232, 242, 252 Determination processing section
401, 501 Power detection section
402, 502 Threshold generation section
503 Comparator

The invention claimed is:

1. A signal detection apparatus, comprising:
a first multiplier that multiplies a first distributed signal provided by distribution of a received signal, by a first multiplication signal;
a first integrator that integrates a result of the multiplication obtained in the first multiplier, in an integration period, and thereby calculates a first correlation value;
a second multiplier that multiplies a second distributed signal provided by the distribution of the received signal, by a second multiplication signal;
a second integrator that integrates a result of the multiplication obtained in the second multiplier, in the integration period, and thereby calculates a second correlation value;
a delay section that delays the first distributed signal or the second distributed signal for time T1 to form the first multiplication signal, and delays the first distributed signal or the second distributed signal for time T2 (T2>T1) to form the second multiplication signal; and
a determination section that determines presence or absence of signals to be detected, respectively, based on a relative value between the first correlation value and the second correlation value, the signals to be detected being a periodic signal with a period T1 and a periodic signal with a period T2.

2. The signal detection apparatus according to claim 1, further comprising:
a third multiplier that multiplies a third distributed signal provided by the distribution of the received signal, by a third multiplication signal; and
a third integrator that integrates a result of the multiplication obtained in the third multiplier, in the integration period, and thereby calculates a third correlation value, wherein
the delay section delays the first distributed signal, the second distributed signal or the third distributed signal for time T3 (T3>T2>T1) to form the third multiplication signal, and
the determination section determines the presence or absence of the signals to be detected, respectively, based on an average value of each pair including two of the first correlation value, the second correlation value and the third correlation value, and based on one remaining correlation value that is not included in each pair, and the signals to be detected are the periodic signal with the period T1, the periodic signal with the period T2, and a periodic signal with a period T3.

3. The signal detection apparatus according to claim 1, further comprising:
a third multiplier that multiplies a third distributed signal provided by the distribution of the received signal, by a third multiplication signal;
a third integrator that integrates a result of the multiplication obtained in the third multiplier, in the integration period, and thereby calculates a third correlation value;
a fourth multiplier that multiplies a fourth distributed signal provided by the distribution of the received signal, by a fourth multiplication signal; and
a fourth integrator that integrates a result of the multiplication obtained in the fourth multiplier, in the integration period, and thereby calculates a fourth correlation value, wherein
the delay section delays the first distributed signal, the second distributed signal or the third distributed signal for time T3 (T3>T2>T1) to form the third multiplication signal, and delays the first distributed signal, the second distributed signal, the third distributed signal or the fourth distributed signal for time T4 (T4>T3>T2>T1) to form the fourth multiplication signal, and
the determination section determines the presence or absence of the signals to be detected, respectively, based on an average value of correlation values selected from at least two or more of the first correlation value, the second correlation value, the third correlation value and the fourth correlation value, and based on a remaining correlation value, and the signals to be detected is are the periodic signal with the period T1, the periodic signal with the period T2, a periodic signal with a period T3, and a periodic signal with a period T4.

4. The signal detection apparatus according to claim 1, further comprising:
a third multiplier that multiplies a third distributed signal provided by the distribution of the received signal, by a third multiplication signal;
a third integrator that integrates a result of the multiplication obtained in the third multiplier, in the integration period, and thereby calculates a third correlation value;
a fourth multiplier that multiplies a fourth distributed signal provided by the distribution of the received signal, by a fourth multiplication signal;
a fourth integrator that integrates a result of the multiplication obtained in the fourth multiplier, in the integration period, and thereby calculates a fourth correlation value;
a second delay section that delays the first distributed signal, the second distributed signal, the third distributed signal or the fourth distributed signal for time T3 to form the third multiplication signal, and delays the first distributed signal, the second distributed signal, the third distributed signal or the fourth distributed signal for time T4 (T4>T3) to form the fourth multiplication signal; and
a second determination section that determines the presence or absence of the signals to be detected, respectively, based on the third correlation value and the fourth correlation value, the signals to be detected being a periodic signal with a period T3 and a periodic signal with a period T4, wherein
length of the period increases in the order of the period T1, the period T2, the period T3 and the period T4.

5. The signal detection apparatus according to claim 1, further comprising:
a power detection section that detects power of the first distributed signal or the second distributed signal; and
a threshold generation section that generates a second signal detection determining threshold, based on a value of the detected power, wherein
the determination section determines the presence or absence of the signals to be detected, respectively, based on a magnitude relationship between a relative value between the first correlation value and the second correlation value, and the signal detection determining threshold, and based on a magnitude relationship between each of the first correlation value and the second correlation value, and the second signal detection determining threshold, and the signals to be detected are the periodic signal with the period T1 and the periodic signal with the period T2.

6. The signal detection apparatus according to claim 1, further comprising:
a first absolute value calculation section that calculates a first absolute value of the first correlation value and outputs the first absolute value to the determination section, and
a second absolute value calculation section that calculates a second absolute value of the second correlation value and outputs the absolute value to the determination section.

7. The signal detection apparatus according to claim 6, wherein the determination section determines the presence or absence of signals to be detected, based on a relative value between the first absolute value and the second absolute value, and based on a signal detection determining threshold.

8. A signal detection apparatus, comprising:
a first multiplier that multiplies a first distributed signal provided by distribution of a received signal, by a first multiplication signal;
a first integrator that integrates a result of the multiplication obtained in the first multiplier, in an integration period, and thereby calculates a first correlation value;
a second multiplier that multiplies a second distributed signal provided by the distribution of the received signal, by a second multiplication signal;
a second integrator that integrates a result of the multiplication obtained in the second multiplier, in the integration period, and thereby calculates a second correlation value;
a delay section that delays the first distributed signal or the second distributed signal for time T1 to form the first multiplication signal, and delays the first distributed signal or the second distributed signal for time T2 (T2>T1) to form the second multiplication signal; and
a determination section that determines presence or absence of a signal to be detected, based on the first correlation value and the second correlation value, the signal to be detected being a periodic signal with a period T1 or a periodic signal with a period T2, wherein
the determination section determines the presence or absence of the signal to be detected, based on a relative value between the first correlation value and the second correlation value, and based on a signal detection determining threshold.

9. The signal detection apparatus according to claim 8, wherein the relative value between the first correlation value and the second correlation value is a ratio of the first correlation value to the second correlation value, or a difference between the first correlation value and the second correlation value.

10. A signal detection method, comprising:
multiplying a first distributed signal provided by distribution of a received signal, by a first multiplication signal, integrating a result of the multiplication in an integration period, and thereby calculating a first correlation value;
multiplying a second distributed signal provided by the distribution of the received signal, by a second multiplication signal, integrating a result of the multiplication in the integration period, and thereby calculating a second correlation value;
delaying the first distributed signal or the second distributed signal for time T1 and thereby forming the first multiplication signal;
delaying the first distributed signal or the second distributed signal for time T2 (T2>T1) and thereby forming the second multiplication signal; and
determining presence or absence of signals to be detected, respectively, based on a relative value between the first correlation value and the second correlation value, the signals to be detected being a periodic signal with a period T1 and a periodic signal with a period T2.

* * * * *